United States Patent
Le et al.

(10) Patent No.: US 7,969,684 B2
(45) Date of Patent: Jun. 28, 2011

(54) WRITE HEAD DESIGN AND METHOD FOR REDUCING ADJACENT TRACK INTERFERENCE AT VERY NARROW TRACK WIDTHS

(75) Inventors: Quang Le, San Jose, CA (US); Jui-Lung Li, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 802 days.

(21) Appl. No.: 11/391,942

(22) Filed: Mar. 28, 2006

(65) Prior Publication Data

US 2007/0230046 A1 Oct. 4, 2007

(51) Int. Cl.
*G11B 5/127* (2006.01)
*G11B 5/11* (2006.01)

(52) U.S. Cl. .................. 360/125.3; 360/125.13

(58) Field of Classification Search . 360/125.02–125.32
See application file for complete search history.

(56) References Cited

U.S. PATENT DOCUMENTS

| | | | | |
|---|---|---|---|---|
| 5,920,449 A | * | 7/1999 | Tagawa | 360/122 |
| 7,054,105 B2 | * | 5/2006 | Mochizuki et al. | 360/125.03 |
| 7,193,815 B1 | * | 3/2007 | Stoev et al. | 360/125.12 |
| 7,392,577 B2 | * | 7/2008 | Yazawa et al. | 29/603.12 |
| 7,394,620 B2 | * | 7/2008 | Taguchi | 360/125.03 |
| 7,551,396 B2 | * | 6/2009 | Hsu et al. | 360/125.3 |
| 7,649,712 B2 | * | 1/2010 | Le et al. | 360/125.3 |
| 2003/0137770 A1 | * | 7/2003 | Ueyanagi | 360/126 |
| 2005/0219746 A1 | * | 10/2005 | Takano et al. | 360/126 |
| 2005/0264931 A1 | * | 12/2005 | McFadyen | 360/126 |
| 2006/0044682 A1 | * | 3/2006 | Le et al. | 360/126 |
| 2006/0245109 A1 | * | 11/2006 | Hsu et al. | 360/126 |
| 2007/0035878 A1 | * | 2/2007 | Guthrie et al. | 360/125 |
| 2007/0115584 A1 | * | 5/2007 | Balamane et al. | 360/126 |

FOREIGN PATENT DOCUMENTS

JP 07262519 A * 10/1995

\* cited by examiner

*Primary Examiner* — William J Klimowicz
(74) *Attorney, Agent, or Firm* — Zilka-Kotab, PC (57) ABSTRACT

A perpendicular write head having a wrap around trailing shield for reducing stray field writing and adjacent track interference. The trailing shield is notched, having an un-notched portion directly behind (trailing) the write pole and first and second notched portions that extend laterally to either side. The un-notched portion of the trailing shield is located adjacent to the trailing edge of the write pole and is separated from the trailing edge of the write pole by a trailing shield notch. The notched portions are separated from the trailing edge of the write gap by a notch depth, measured along the trailing direction, the notch depth as measured in the trailing direction being larger than the trailing shield distance. The notch depth as measured in the trailing direction is preferably 25-50 nm larger than the trailing shield gap distance.

12 Claims, 12 Drawing Sheets

WRITE HEAD DESIGN AND METHOD FOR REDUCING ADJACENT TRACK INTERFERENCE AT VERY NARROW TRACK WIDTHS

FIELD OF THE INVENTION

The present invention relates to perpendicular magnetic recording and more particularly to a novel trailing magnetic shield design and a method for manufacturing such a shield design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (i.e. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design or a studded design. In a floating design the magnetic trailing shield is not directly, magnetically connected with the other structures of the write head. In a studded design, the trailing shield can be magnetically connected with the return pole.

Magnetic field from the write pole results in a flux in the shield that essentially travels through the magnetic medium back to the return pole of the write head. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, even when an optimal shield gap is maintained, a certain amount of flux is lost to the trailing shield.

Therefore, there is a need for a need for a magnetic trailing shield design that can provide the desired reduction of switching field, but which also minimizes the loss of write field. Furthermore, such a shield design must be easily manufacturable using existing manufacturing techniques and materials in order to be practical.

SUMMARY OF THE INVENTION

The present invention provides a magnetic write head having a trailing shield that is notched to provide optimal write field canting with a minimum of write field loss. The write head includes a magnetic write pole, and a magnetic trailing shield separated from the trailing edge of the write pole by a trailing shield gap.

The trailing shield, therefore, can have a trailing portion directly trailing the write pole that is separated from the write pole by a trailing shield gap as measured in the trailing direction and has first and second notched portions extending laterally from the trailing portion, the notched portions being recessed in the trailing direction so that they are further (as measured in the trailing direction) from the trailing edge of the write pole than the trailing portion is.

In other words, the trailing shield can have notched portions that are recessed in the trailing direction relative to a centrally disposed trailing portion of the trailing shield. This advantageously provides the desired field canting by providing a desired trailing shield gap directly trailing the write head where the canting effect is desired, while preventing write field loss to portions of the trailing shield that are laterally to the sides of the write pole.

The present invention also provides a cost reliable, cost effective method for manufacturing a write head according to an embodiment of the invention using currently available manufacturing techniques and materials. The method includes depositing a magnetic write pole material, a trailing shield gap defining layer and a notch depth defining layer. A mask is then formed over the layers and an ion mill is performed to define the write pole. A layer of non-magnetic fill material is then deposited and possibly a CMP stop layer. A chemical mechanical polish (CMP) is then performed sufficiently to open up the notch depth defining layer and a reactive ion etch is performed to remove the remaining notch depth defining layer from the area over (trailing) the write pole. A magnetic material can then be deposited to form the trailing shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
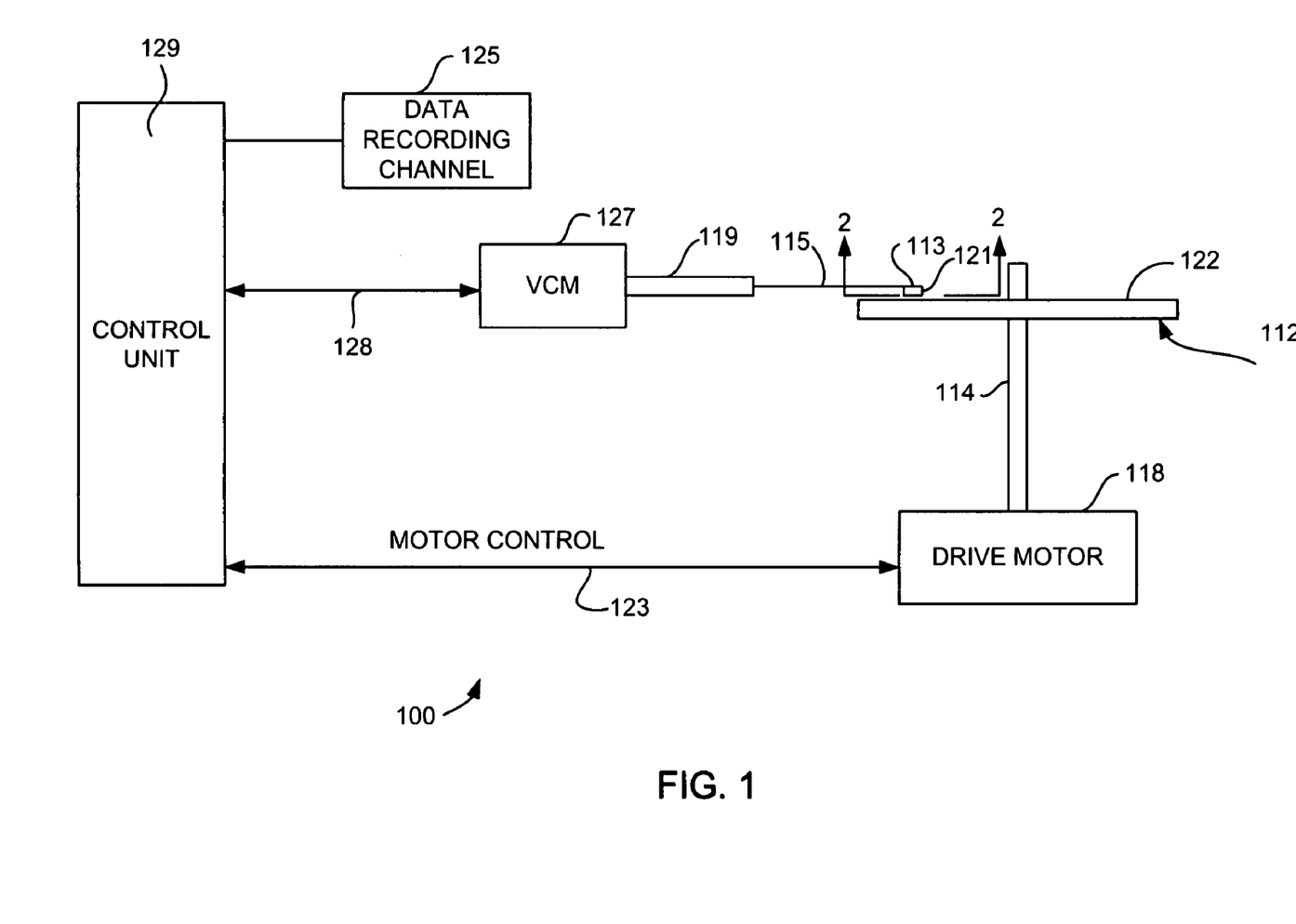
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
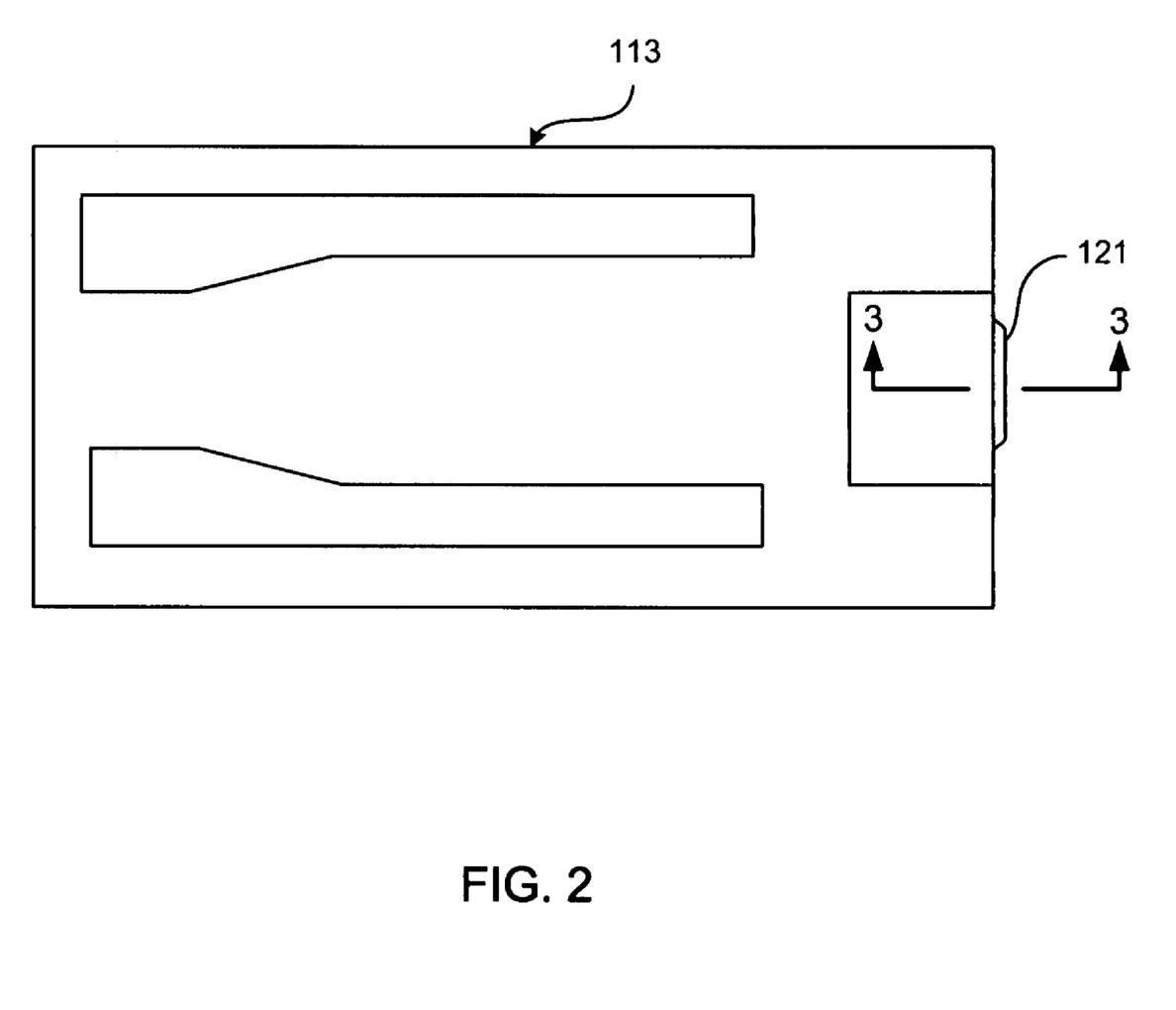
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
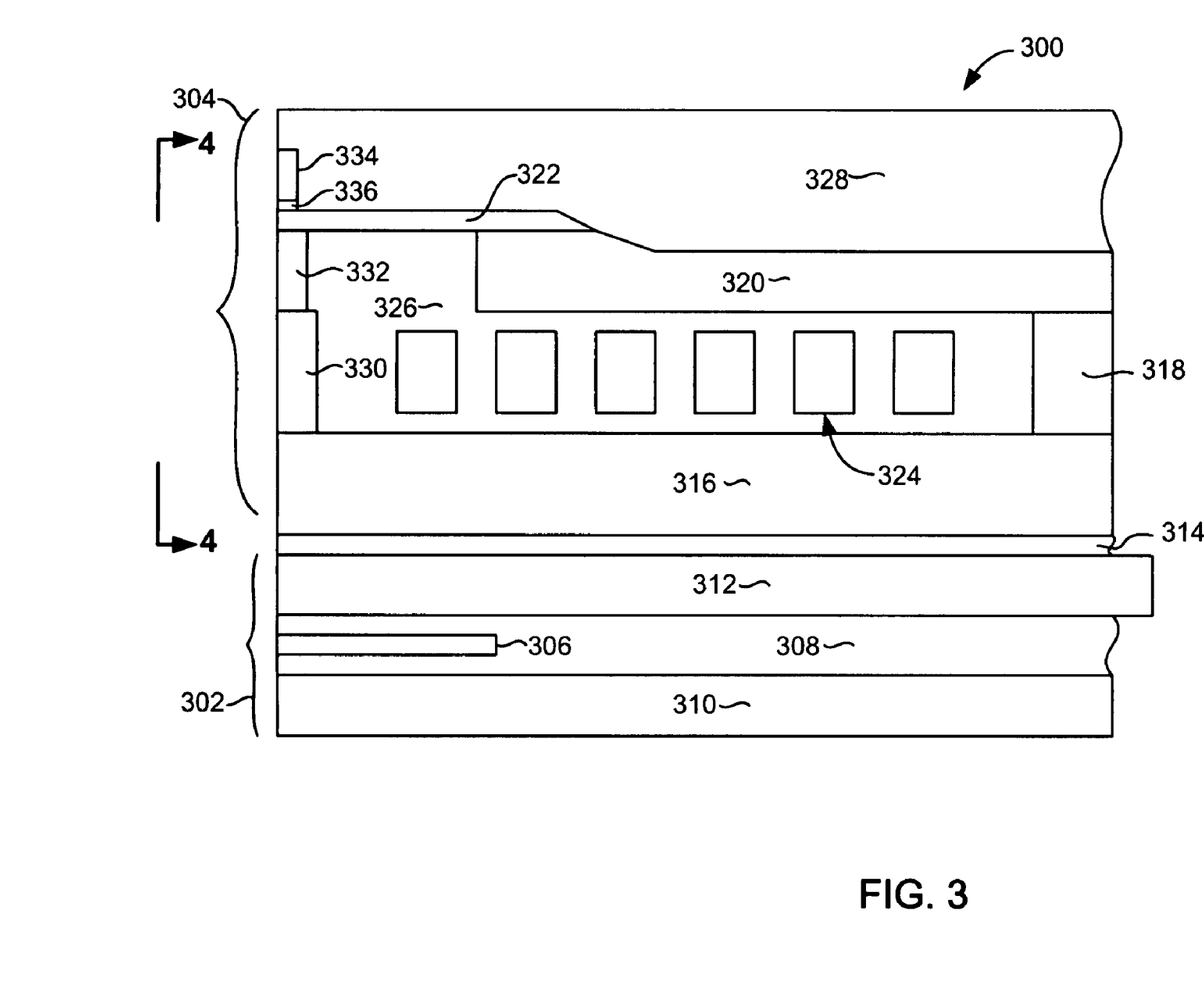
FIG. 3 is a cross sectional view view, taken from line 3-3 of FIG. 2 and rotated 90 degrees counterclockwise, of a magnetic head according to an embodiment of the present invention.

With reference now to FIG. 3, a magnetic head 300 according to an embodiment of the present invention includes a read head 302 and a write head 304. The read head 302 includes a magnetoresistive sensor 306 embedded within a non-magnetic, electrically insulating gap layer 308, between first and second magnetic shields 310, 312. The sensor 302 can be a giant magnetoresistive sensor (GMR), tunnel valve, etc. The gap layer 308 can be alumina or some other material, and the shields can be a magnetic material such as NiFe. The read head 302 may be separated from the write head 304 by an electrically insulating gap layer 314, which can be alumina or some other non-magnetic, electrically insulating material. The write head 304 includes a return pole 316, back gap layer 318, and shaping layer or flux guide layer 320, all of which are constructed of a magnetic material, which can be, for example, NiFe. The return pole 316 is magnetically connected with the back gap layer 318 at a back end of the write head 304 opposite the air bearing surface (ABS). The back gap layer is magnetically connected with the shaping layer 320 at the back end of the write head 304. The shaping layer 320 is magnetically connected with a write pole 322, which extends toward (preferably to) the ABS. The write pole 322 can be constructed of a high magnetic saturation material (high Bsat) and is preferably constructed as a laminate structure that includes layers of magnetic material separated by thin non-magnetic layers.

An electrically conductive coil 324 passes between the shaping layer 320 and write pole 322 and the return pole 316. The coil 324 can be constructed of, for example, Cu and is embedded in one or more layers of non-magnetic, electrically insulating material 326. A nonmagnetic, electrically insulating protective coating 328 may be provided over the top of the write head 304, and may be constructed of, for example alumina.

With continued reference to FIG. 3, the write head may include a shield structure, which may include a pedestal structure 330 and a flux catcher structure 332. This shield structure is designed to prevent magnetic field from the write coil 324 from reaching and affecting the magnetic medium (not shown) during use. A trailing magnetic shield 334 is provided above the write pole 322, and is separated from the write pole 322 by non-magnetic trailing shield gap 336.

Figure 4:
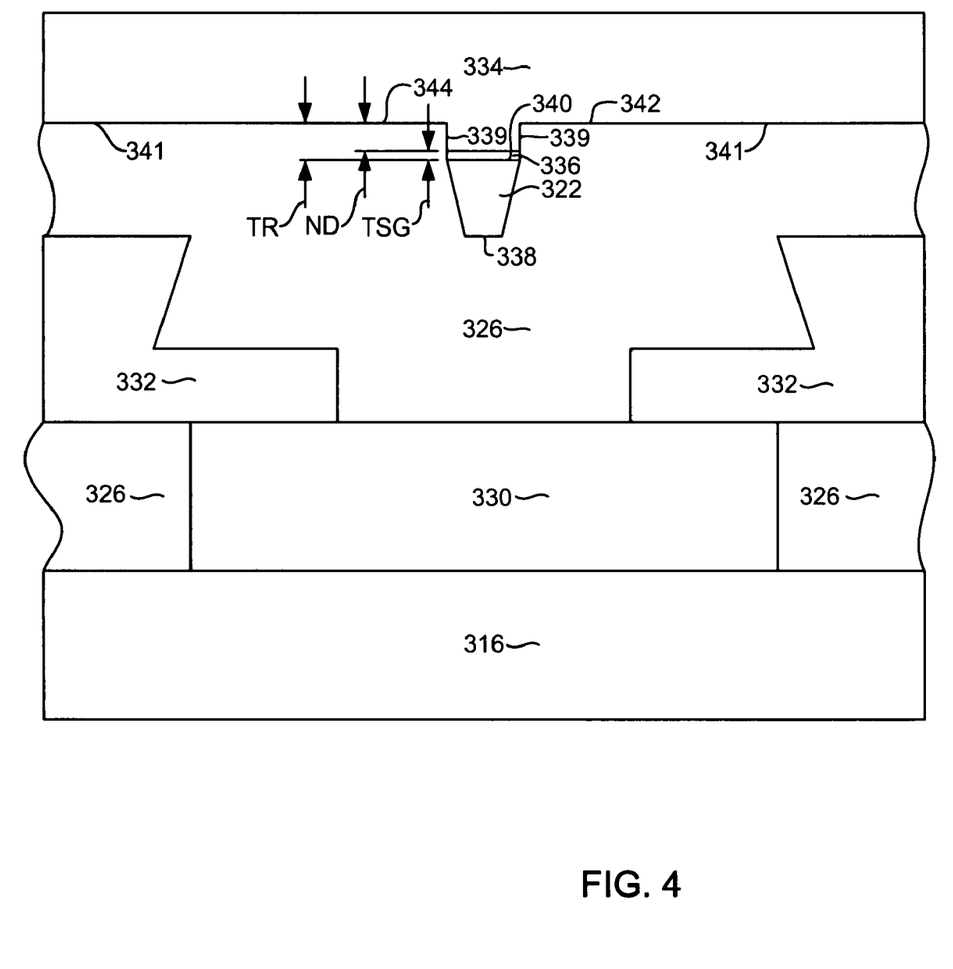
FIG. 4 is an ABS view of a write head according to an embodiment of the invention, taken from line 4-4 of FIG. 3.

With reference now to FIG. 4, an ABS view of the write head 304 shows the shields and write pole structures in greater detail. As will be appreciated by those skilled in the art, structures located toward the top of the page are located in a trailing direction on the write head 304, while those toward the bottom are in a leading direction. The terms trailing and leading refer to the direction of flight over a magnetic medium during use. Therefore, the write pole 322 has a leading edge 338 and a trailing edge 340. As can be seen, the write pole 322 has a preferred trapezoidal configuration that prevents skew related adjacent track interference during use.

As can be seen in FIG. 4, the write pole 322 has a cross section as viewed from the ABS that is much smaller than the cross section of the return pole as viewed from the ABS. When an electrical current flows through the write coil 324 (FIG. 3) a magnetic field from the write coil induces a magnetic flux to flow through the return pole 316, back gap 318, shield 320, and write pole 322. This magnetic flux causes a strong concentrated magnetic write field to be emitted from the end of the write pole at the ABS. The field travels as a magnetic flux through the magnetic medium (not shown) to return to the write head 304 at the return pole 316. Because the cross section of the return pole 316 is much larger than the cross section of the write pole, the magnetic field is sufficiently week and spread out that the signal written by the write pole 322 is not erased by the return pole 316.

With reference still to FIG. 4, the shield pedestal 330 extends from the trailing edge of the return pole 316, and the flux catcher structures 332 extend from the trailing edge of the pedestal 330. The pedestal 330 and flux catchers 332 can be constructed of, for example NiFe or some other magnetic material.

As mentioned above, the write head includes a magnetic trailing shield 334, located at the trailing end of the write head 322. The trailing shield 334 can be constructed of NiFe or some other magnetic material, and the trailing shield gap 336 can be constructed of a non-magnetic material such as alumina. As mentioned above, a magnetic write field from the write pole 322 magnetizes a magnetic medium such as a magnetic disk in order to record data on the medium. In a perpendicular magnetic recording system such as one in which the magnetic write head 304 can be embodied, a magnetic medium (not shown) includes a magnetically soft under layer and a magnetically hard (high coercivity) top layer. The magnetic field from the write pole must be strong enough to locally magnetize the high coercivity top layer of the medium in a direction substantially perpendicular to the surface of the medium. It has been found however, that if the field from the write head is canted slightly at an angle rather than being perfectly perpendicular to the surface of the medium, the switching field can be reduced, which increases the speed of writing. To understand this phenomenon, one can consider that the magnetic field in the medium does not have to switch a complete 180 degrees, but, being canted, has a head start in switching from one direction to another.

The trailing shield 334 provides the canting of the magnetic field by attracting magnetic field as it is emitted from the write pole 322. In order to provide this canting function, the trailing shield 334 must be separated by a gap 336 having a distance which is carefully controlled. If the trailing shield gap 336 is too large, there will be little or no canting of the magnetic field and the trailing shield 334 will be ineffective. If the trailing shield gap 336 is too small, an unacceptable amount of magnetic field will leak to the shield 334, resulting in an unacceptable loss of available write field strength. Accordingly, the write head 304 preferably has a trailing shield gap (TSG) of that is, ideally, about equal to the spacing between the head and the underlayer of the magnetic medium.

Even with an ideal trailing shield gap, a certain amount of magnetic field is lost to the trailing shield 334. It is of course desirable to minimize the amount of magnetic field lost to the trailing shield 334. It has been found that the amount of write field lost can be significantly reduced by forming the trailing shield 334 with notches 342, 344. These notches reduce the amount of write field lost toward the sides of the write pole 322 while providing the desired trailing shield effect directly behind the write pole 322, where it is desired. The trailing shield notches 342, 344 have side walls 339 that extend substantially in the trailing direction from the sides of the write pole. The sides formed by the notches 342, 344 extend a desired notch depth distance (ND) from the leading edge of the shield, for example 25 to 50 nm (depending on the design and areal density) in the trailing direction as measured from the write gap (or leading-most portion of the trailing shield 334), at which point the trailing shield extends laterally to either side. Therefore, the trailing shield has a central portion located between the notched portions 342, 344. This central portion (or un-notched portion) is disposed adjacent to, and directly trailing, the write pole 322 and has a leading edge that is separated from the trailing edge 340 of the write pole 322 by a trailing shield gap distance (TSG). The notched portions 342, 344 have leading edges 341 that are separated from the trailing edge of the write pole 322 by a trailing recess distance (TR) as measured in the trailing direction (ie. vertically in FIG. 4), the distance TR being greater than the distance TSG. The notches 342, 344 ensure that the desired field canting effect can be achieved while minimizing the amount of write field lost to the trailing shield. The notch depth (ND) is preferably larger than the trailing shield gap TSG.

Although the trailing shield 334 has been described herein as a floating shield in that it is not magnetically connected with the return pole 316, the invention could also be embodied in a write head having a trailing shield that is magnetically connected with the return pole. In that case, magnetic pedestals could be provided to magnetically connect the leading edge of the shield 334 with the flux catcher structures 332.

Figure 5:
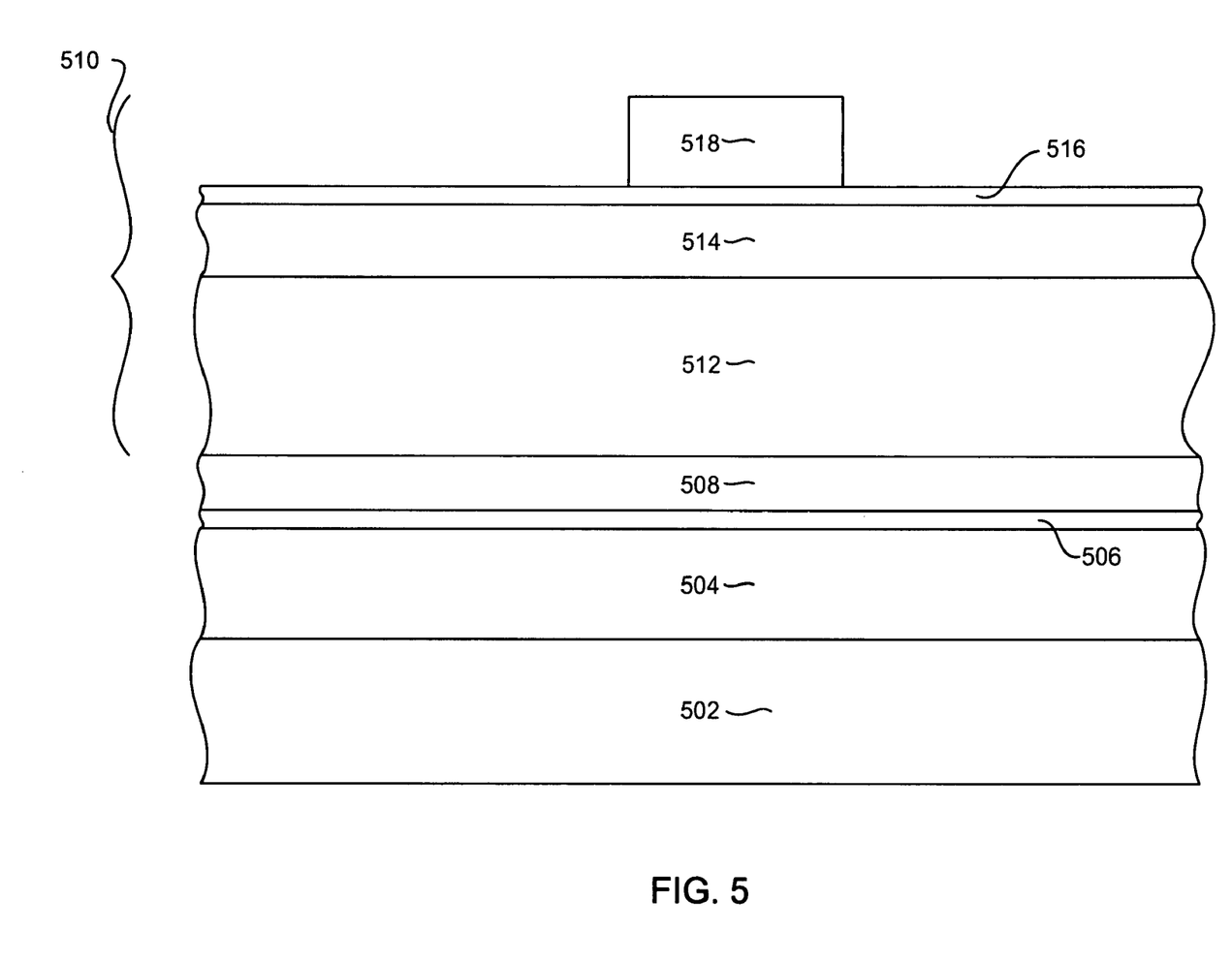
FIGS. 5-11 are cross sectional views of a portion of a write head in various intermediate stages of manufacture, illustrating a method of manufacturing a magnetic write head according to an embodiment of the invention.

With reference now to FIGS. 5-11, a method for constructing a write head according to an embodiment of the invention will be described. The following description of a method for constructing a write head begins with the construction of a write pole, the other write pole elements such as return pole, back gap coil, shaping layer having already been constructed according to methods familiar to those skilled in the art. With particular reference to FIG. 5, a substrate 502 is provided. The substrate 502 can be, for example a layer of alumina or can be a combination of materials. One or more layers of write pole material 504 are deposited. While the write pole material layer 504 could be a single layer of high saturation magnetic material, the write pole material 504 preferably includes many layers of high saturation magnetic material such as CoFe separated by thin layers of non-magnetic material such as alumina A trailing shield gap defining layer 506 is deposited over the write pole material. The trailing shield gap defining layer 506 can be constructed of a non-magnetic material that is resistant to removal by reactive ion etching (RIE) such as alumina ($Al_2O_3$), and has a thickness that determines the thickness of the trailing shield gap as described in FIGS. 3 and 4 above.

With reference still to FIG. 5, a notch depth defining layer 508 is deposited over the trailing shield gap defining layer. The notch depth defining layer 508 can be constructed of a material that is resistant to chemical mechanical polishing, but which can be removed by reactive ion etching (RIE). The notch depth defining layer 512 can therefore, be constructed of diamond like carbon (DLC).

With reference still to FIG. 5, a mask structure 510 is deposited over the write pole material 504, trailing shield gap defining layer 506 and notch depth defining layer 508. The mask structure may be several forms, but preferably includes: a first image transfer layer 512; a hard mask 514 formed over the first image transfer layer; possibly a second image transfer layer 516 formed over the hard mask layer 514; and a photo mask 518 formed over the second image transfer layer 516. The first and second image transfer layers 512, 516 may be a soluble polyimide material such as DURIMIDE® or some similar material. The hard mask 514 may be, for example silicon oxide ($SiO_2$) or some similar material. The photo mask 518 is constructed of a photosensitive material such as photoresist. This photosensitive material is photolithographically patterned to form a photomask structure 518 having a width configured to define a track width of the write pole 322 (FIG. 4).

Figure 6:
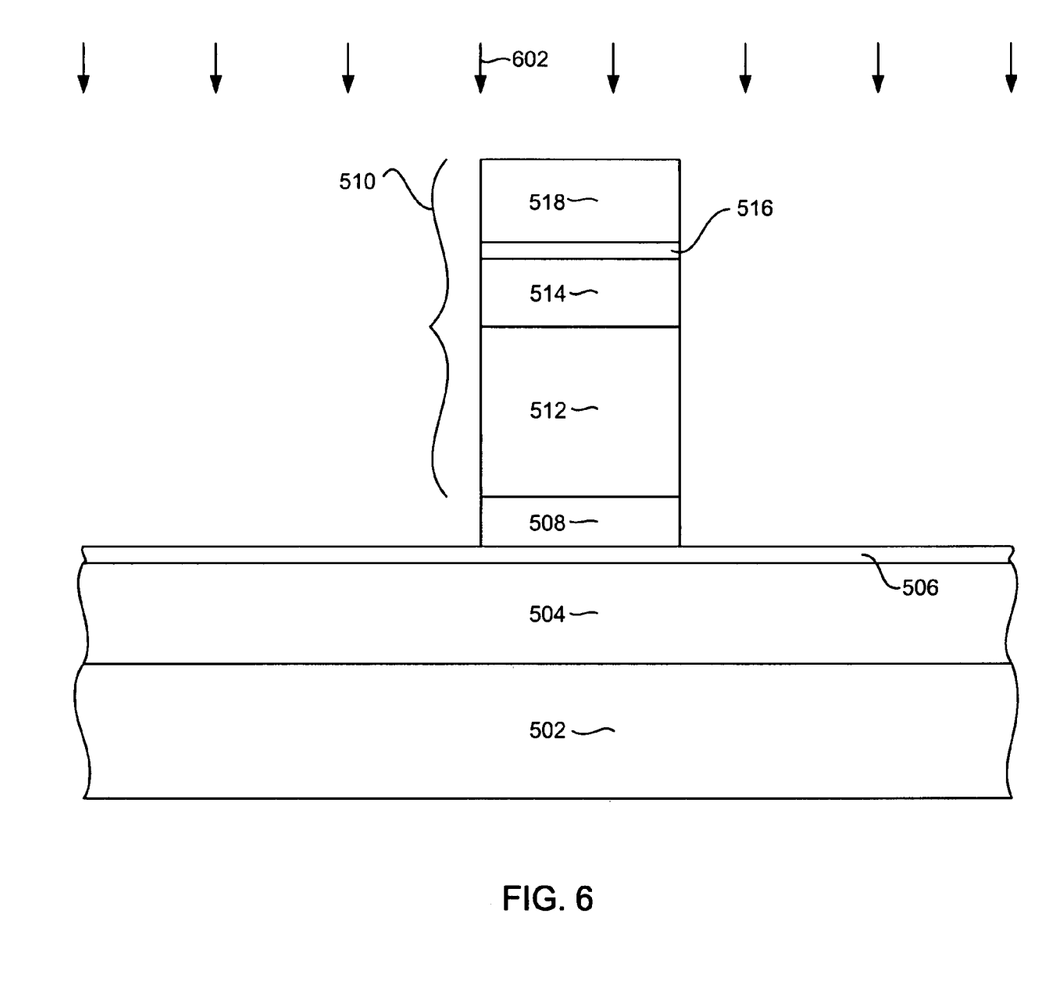

With reference now to FIG. 6, one or more reactive ion etch steps (RIE) 602 are performed to transfer the image of the photomask 518 onto the underlying mask layers 512, 514, 516 by removing portions of those layers that are not protected by the photo mask structure 518. This process may involve a three part reactive ion process using a series of reactive ion etches using chemistries chosen to remove specific mask layers 512, 514, 516. Because the notch depth defining layer 508 is constructed of a material that can readily be removed by RIE, the RIE process 602 also transfers the mask image onto the notch depth defining layer, by removing portions of the notch depth defining layer 508 that are not protected by the mask structure 510.

Figure 7:
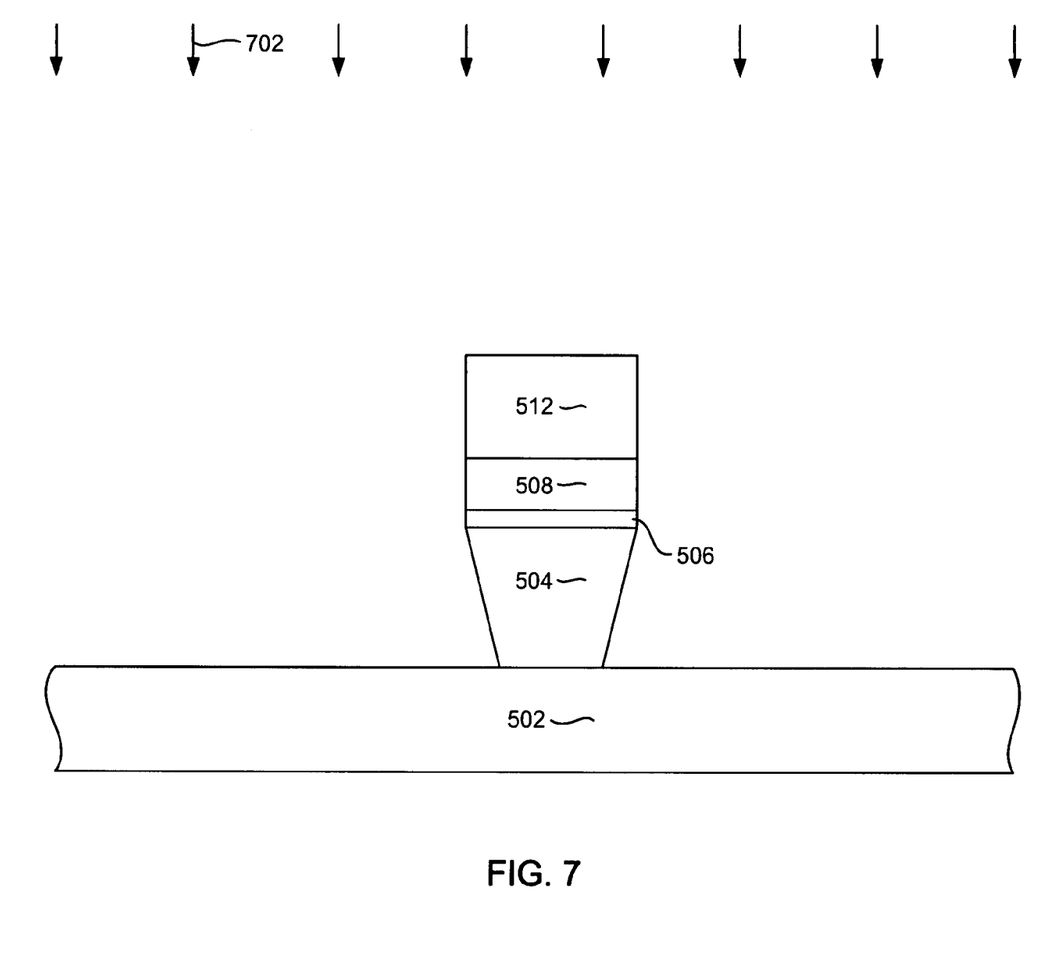

With reference now to FIG. 7, one or more ion mills 702 are performed to remove portions of the trailing shield gap defining layer 506 and write pole material layer 504 to define a write pole 504. Preferably the ion mill includes an ion mill performed substantially normal to planes of the layers, (i.e. straight down). This is followed up by an ion mill performed at an angle relative to normal to form the write pole 504 with inward sloping sides that define a trapezoidal write pole 504. This may be further followed up with an ion mill performed at a glancing angle to remove any re-deposited material from the sides of the write pole 504. It can be seen that the ion mill process (or processes) 702 used to define the write pole 504 removes a substantial portion of the mask structure 510, leaving a portion of the first image transfer layer 512 and the notch depth defining layer 508.

Figure 8:
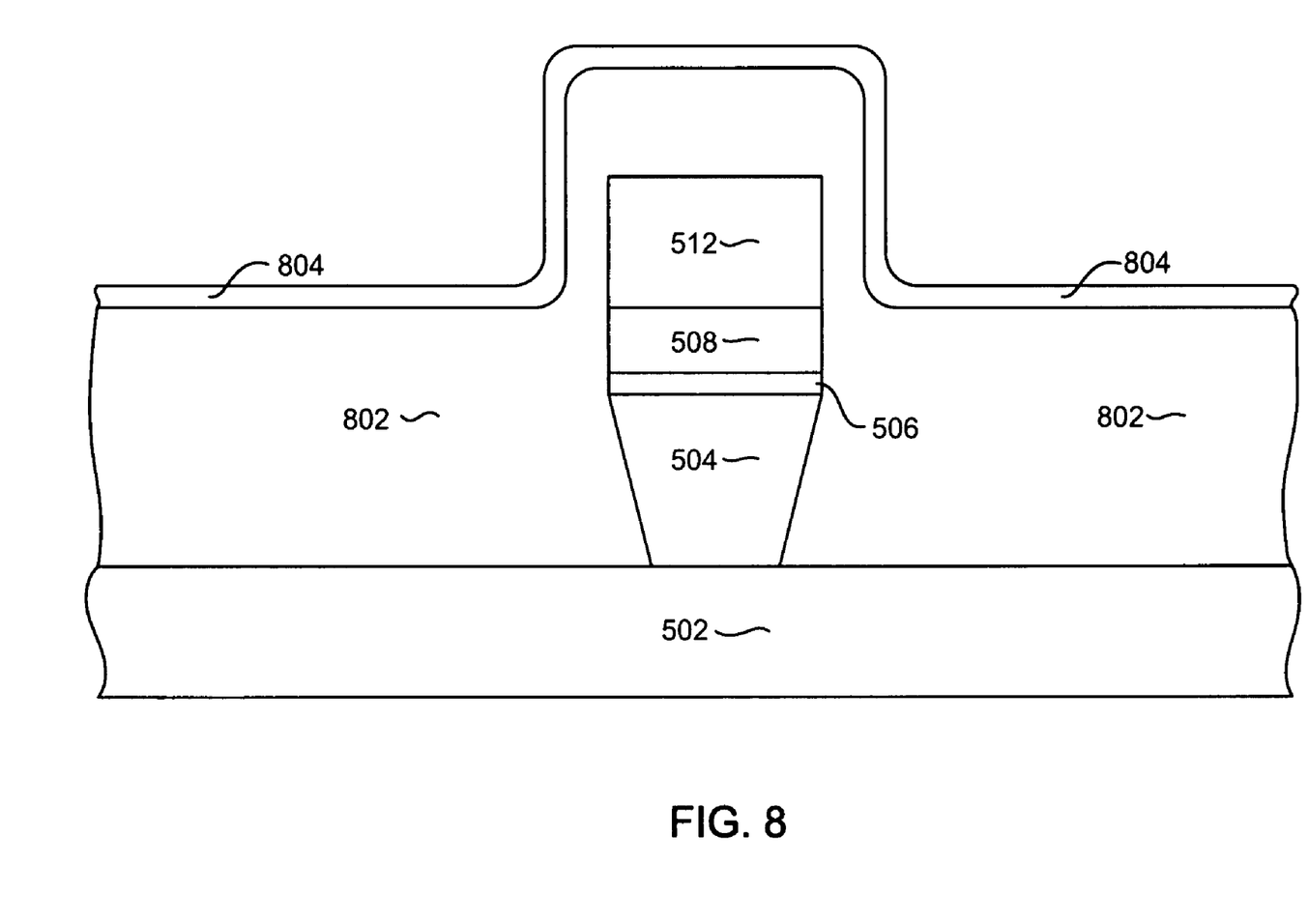

With reference now to FIG. 8, a fill layer of hard, electrically insulating, non-magnetic material such as alumina ($Al_2O_3$) 802 is deposited. The fill layer 802 is preferably deposited at least to a level of the top of the notch depth defining layer 508 as shown. An optional CMP stop layer 804 may be deposited. If used, the CMP stop layer is preferably a material that is removable using a reactive ion etch (RIE)

while also being resistant to CMP. A suitable CMP stop material 804 would, therefore, be diamond like carbon (DLC).

Figure 9:
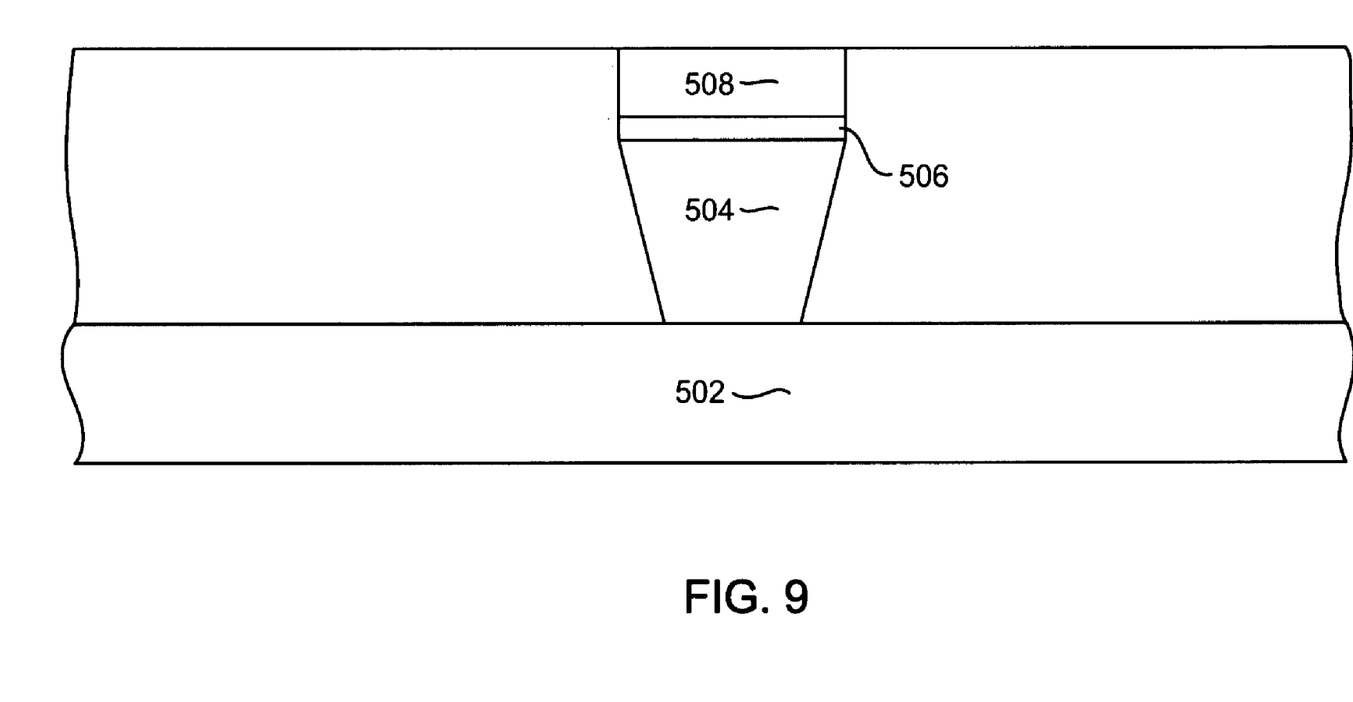
Figure 10:
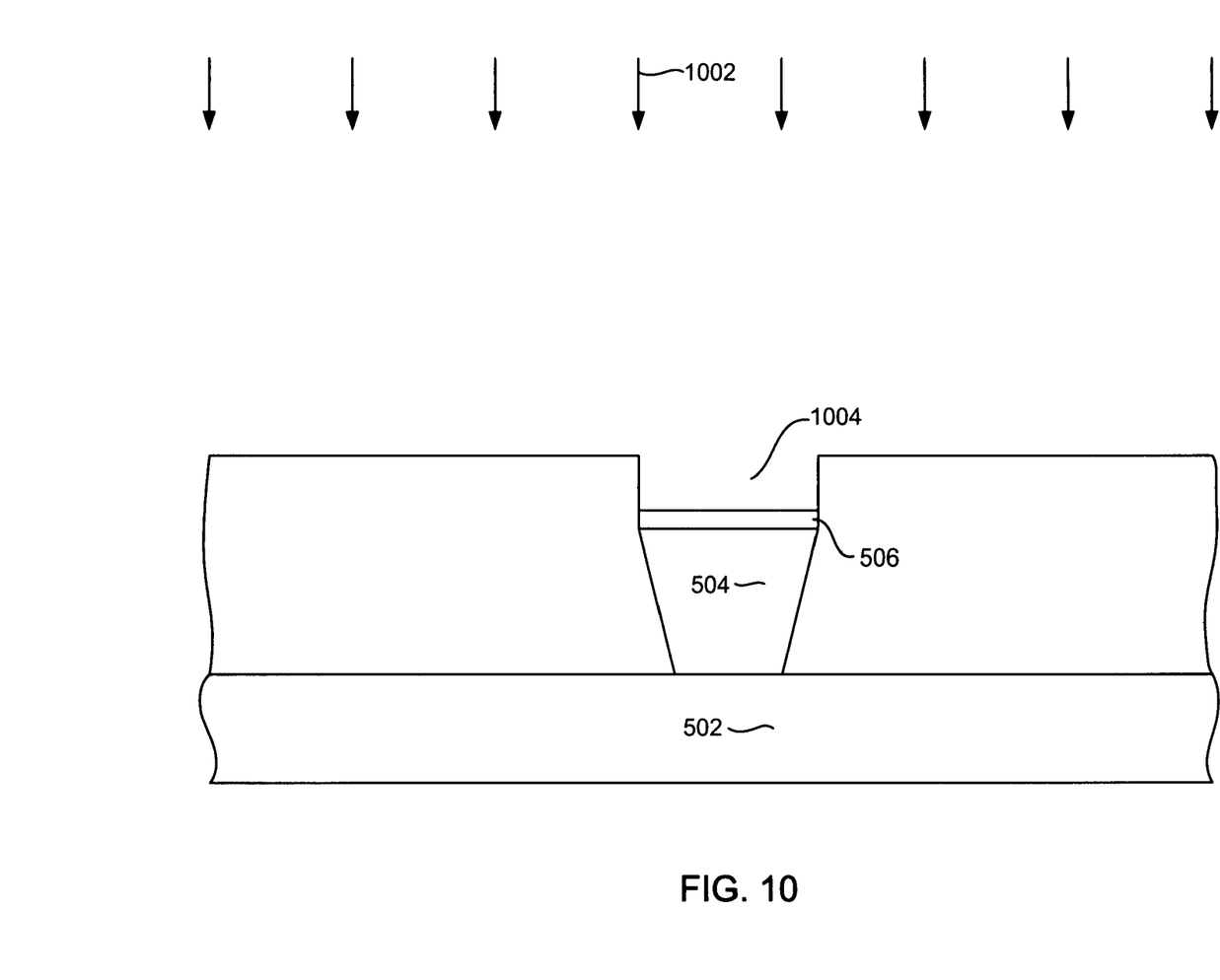
Figure 11:
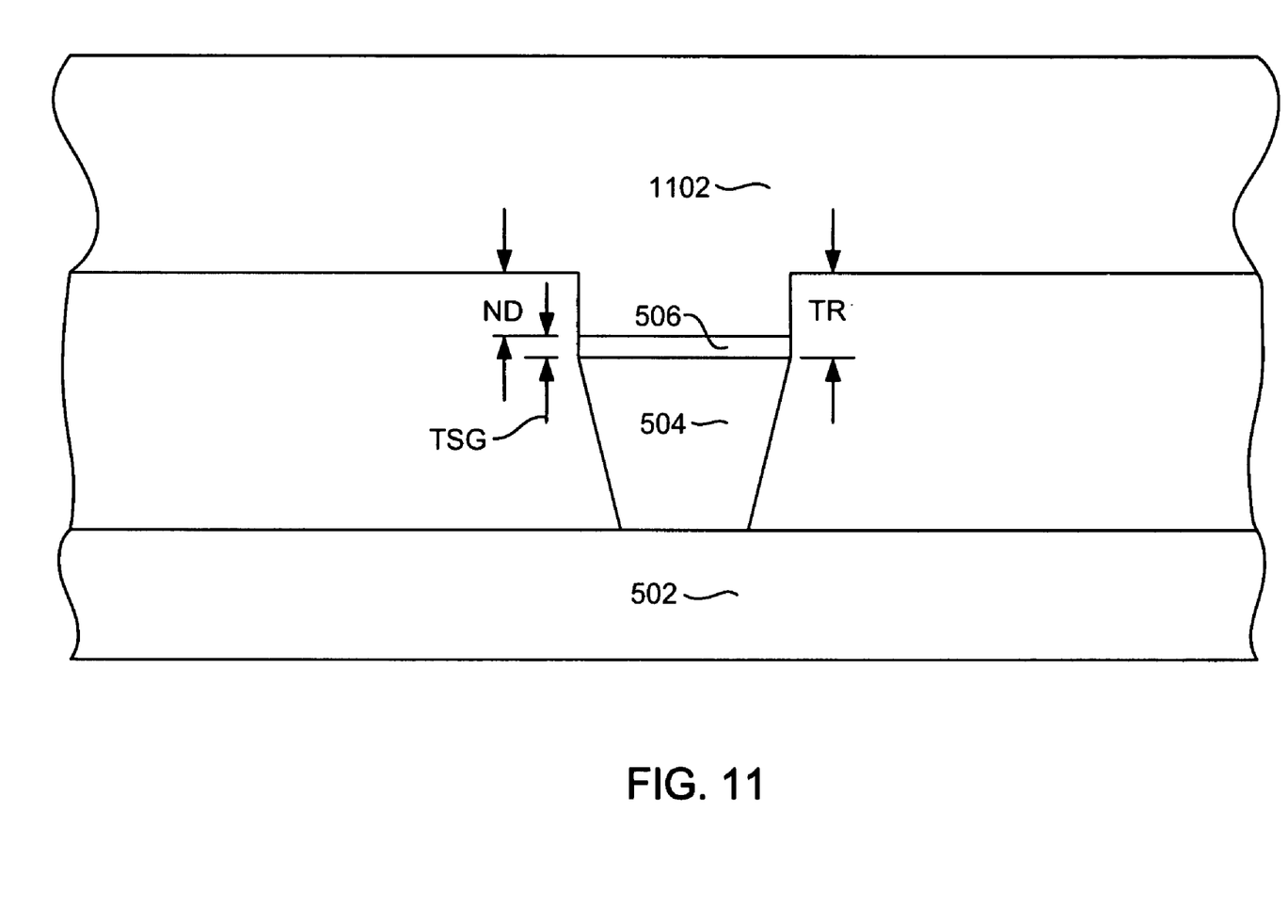

Then, with reference to FIG. 9 a chemical mechanical polish (CMP) is performed sufficiently to open up the notch depth defining layer. Thereafter, with reference to FIG. 10, a second reactive ion etch process 1002 is performed sufficiently to remove the notch depth defining layer 508 (FIGS. 5-9), leaving an opening 1004. Then, with reference to FIG. 11, a magnetic shield material 1102 is deposited. The deposition can be performed by sputter depositing an electrically conductive seed layer, and then electroplating a magnetic material. The deposition of the magnetic material 1102 could also be entirely sputter deposited in a sputter deposition chamber. The deposition of the magnetic material 1102 forms a trailing magnetic shield having a notch of a depth (ND), defined by the previously deposited notch depth defining layer 508 (FIGS. 5-9). The notched portions of the trailing shield 1102 also have trailing recess depth TR that is equal to the notch depth ND plus the trailing shield gap thickness TSG.

Figure 12:
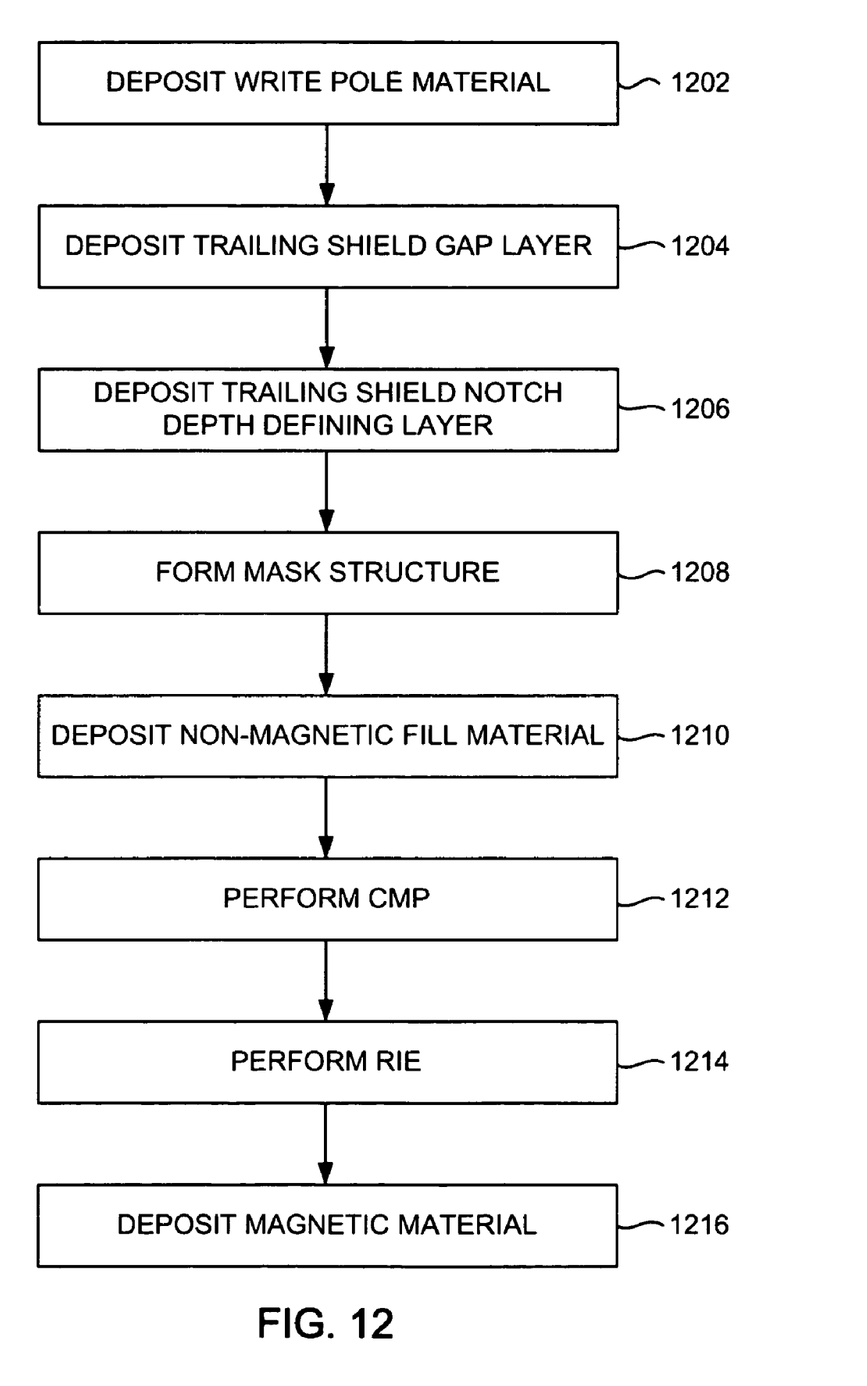
FIG. 12 is a flow chart summarizing a method of constructing a magnetoresistive sensor according to an embodiment of the invention.

With reference to FIG. 12, a method for constructing a sensor according to an embodiment of the invention can be summarized as follows. In a step 1202 a write pole material is deposited over a substrate. Then, in a step 1204 a trailing shield gap defining layer is deposited. Thereafter, in a step 1206 a notch depth defining layer is deposited. The notch depth defining layer is deposited to such a thickness as to form a notch of a desired depth in the finished trailing shield. Then, in a step 1208 a mask structure is formed over the notch depth defining layer. The definition of the mask structure may include a photolithographic process for forming a photomask, and one or more reactive ion etch processes (RIE) to transfer the image of the photomask onto the underlying mask layers.

With continued reference to FIG. 1210 a layer of non-magnetic fill material such as alumina is deposited. A CMP stop layer may also be deposited over the fill layer. Then, in a step 1212 a chemical mechanical polish process (CMP) is performed to remove the mask structure and open up the notch depth defining structure. Then, in a step 1214 another REI process is performed to remove the remaining notch depth defining layer, leaving an opening over the trailing shield gap layer. In a step 1216, a magnetic material such as NiFe can be deposited to form the trailing shield.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A write head for perpendicular magnetic recording, the write head comprising:
   a magnetic write pole, extending to an air bearing surface and having first and second laterally opposed sides;
   a non-magnetic gap material;
   a magnetic trailing shield separated from the write pole by the non-magnetic gap material, the trailing shield being configured with first and second notches extending laterally outward from the write pole, wherein the magnetic trailing shield is shorter than the magnetic write pole as measured from the air bearing surface; and
   a magnetic leading shield, the leading shield being formed with laterally inward facing third and fourth notches, such that portions of the leading shield that are laterally further from the write pole extend further in a trailing direction than do portions that are laterally closer to the write pole.

2. A write head as in claim 1 wherein the first and second notches each have a notch depth measured in the trailing direction of 25 to 50 nm.

3. A write head as in claim 1, wherein the first and second laterally opposed sides of the write pole taper away from one another in the trailing direction to have a widest portion at a trailing edge of the write pole, the initiation of the first and second notches being laterally aligned with the first and second sides of the write pole at the trailing edge of the write pole.

4. A write head as in claim 1 wherein the leading shield has un-notched laterally outward portions that extend in the trailing direction to a level of the leading edge of the write pole.

5. A write head for perpendicular magnetic recording, the write head comprising:
   a magnetic write pole, extending to an air bearing surface and having first and second laterally opposed sides;
   a non-magnetic gap material;
   a magnetic trailing shield separated from the write pole by the non-magnetic gap material, the trailing shield being configured with first and second notches each initiating at a location that is laterally aligned with one of the first and second sides of the write pole and extending laterally outward therefrom, wherein the magnetic trailing shield is shorter than the magnetic write pole as measured from the air bearing surface; and
   a magnetic leading shield, the leading shield being formed with laterally inward facing notches, such that portions of the leading shield that are laterally further from the write pole extend further in a trailing direction than do portions that are laterally closer to the write pole.

6. A write head as in claim 5 wherein the first and second notches each have a notch depth measured in the trailing direction of 25 to 50 nm.

7. A write head as in claim 5, wherein the first and second laterally opposed sides of the write pole taper away from one another in the trailing direction to have a widest portion at a trailing edge of the write pole, the initiation of the first and second notches being laterally aligned with the first and second sides of the write pole at the trailing edge of the write pole.

8. A write head for perpendicular magnetic recording, the write head comprising:
   a magnetic write pole having a leading edge, a trailing edge opposite the leading edge, and first and second laterally opposed sides extending between the leading and trailing edges;
   a magnetic trailing shield having a center portion disposed adjacent to the trailing edge of the write pole and first and second notched portions each extending laterally outward from the center portion, the center portion of the trailing shield being separated from the write pole by a trailing shield gap distance as measured in a trailing direction, and the first and second notched portions being separated from the trailing edge of the write pole by a trailing recess distance as measured in the trailing direction, the trailing recess distance being greater than the trailing shield gap distance, wherein the magnetic trailing shield is shorter than the magnetic write pole as measured from an air bearing surface; and
   a magnetic leading shield, the leading shield being formed with laterally inward facing third and fourth notches, such that portions of the leading shield that are laterally further from the write pole extend further in the trailing direction than do portions that are laterally closer to the write pole.

9. A write head as in claim 8 wherein the trailing recess distance is at least 25-50 nm larger than the trailing shield gap distance.

10. A write head as in claim 8 wherein the trailing recess distance is 25-50 nm greater than the trailing shield gap distance.

11. A write head as in claim 8 wherein the center portion and the first and second laterally extending notched portions meet at first and second junctions that define first and second side walls.

12. A write head as in claim 8 wherein the trailing shield further comprises first and second side walls, each extending substantially in the trailing direction, the first side wall connecting the center portion of the trailing shield with the first notched portion and the second side wall connecting the center portion of the trailing shield with the second notched portion.

* * * * *